(12) United States Patent
Guo et al.

(10) Patent No.: US 8,126,088 B2
(45) Date of Patent: Feb. 28, 2012

(54) DEMODULATOR WITH SIGNAL PRECONDITIONER

(75) Inventors: Dawei Guo, Shanghai (CN); Ronghui Kong, Shanghai (CN)

(73) Assignee: Beken Corporation, Shanghai (CN)

( * ) Notice: Subject to any disclaimer, the term of this patent is extended or adjusted under 35 U.S.C. 154(b) by 703 days.

(21) Appl. No.: 12/350,863

(22) Filed: Jan. 8, 2009

(65) Prior Publication Data

US 2010/0142652 A1    Jun. 10, 2010

(30) Foreign Application Priority Data

Dec. 4, 2008    (CN) .......................... 2008 1 0044055

(51) Int. Cl.
*H04L 27/00*    (2006.01)
(52) U.S. Cl. ........................................ 375/324
(58) Field of Classification Search .............. 375/259, 375/316, 324, 327, 340; 379/387.02; 324/607; 341/126, 127, 128, 155, 156, 159
See application file for complete search history.

(56) References Cited

U.S. PATENT DOCUMENTS

| 6,219,380 | B1 * | 4/2001 | Wang et al. | 375/239 |
| 7,397,300 | B2 * | 7/2008 | Quinlan et al. | 329/300 |
| 2009/0034601 | A1 * | 2/2009 | Shakiba et al. | 375/232 |

FOREIGN PATENT DOCUMENTS

CN    1518246 A    8/2008

OTHER PUBLICATIONS

Liu, Shaopin, "First Office Action," CN Application No. 200810044055.7, Mar. 4, 2011, State Intellectual Property Office, China.

* cited by examiner

*Primary Examiner* — Sam K Ahn
(74) *Attorney, Agent, or Firm* — Perkins Coie LLP; Aaron Wininger

(57) ABSTRACT

A method and apparatus for demodulating an input signal, for example, in a communications system, is disclosed. The apparatus includes a signal preconditioner and a demodulator. The signal preconditioner may include a low-pass filter and a hysteretic comparator that are configured to precondition a preconditioner input signal to provide a preconditioner output signal. The modulator may be configured to demodulate the preconditioner output signal.

17 Claims, 5 Drawing Sheets

DEMODULATOR WITH SIGNAL PRECONDITIONER

CROSS-REFERENCE TO RELATED APPLICATION

This application claims priority to Chinese Patent Application No. 200810044055.7, filed Dec. 4, 2008, the disclosure of which is hereby incorporated by reference in its entirety.

TECHNICAL FIELD

The present disclosure is related to methods and apparatus for demodulating an input signal, for example, in a communications system.

BACKGROUND

Demodulators are often employed in communication systems. For example, demodulators may be employed to demodulate (e.g., separate) the carrier wave and data components of an input signal. Demodulators may be employed in receivers and transceivers (e.g., wired telephones, cable boxes, cable modems, cordless telephones, mobile telephones, amateur radio transceivers, televisions, optical transceivers, etc.), and in other devices.

With real-world systems, the input signal also generally includes a noise component. The noise component may include noise resulting from adjacent channel interference, electromagnetic interference, phase jitter, atmospheric and/or line losses, channel and/or circuit non-idealities, and/or the like. The noise component may adversely affect demodulation of the input signal. For example, data component distortion, increased bit error rate (BER), increased intersymbol interference, decreased link margin, decreased signal-to-noise ratio (SNR), and/or the like, may be attributable to the noise component of the input signal.

DETAILED DESCRIPTION

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. The term "based on" is not exclusive and is equivalent to the term "based, at least in part, on" and includes being based on additional factors, whether or not the additional factors are described herein. Although certain terms may be emphasized below, any terminology intended to be interpreted in any restricted manner will be overtly and specifically defined as such in this Detailed Description section.

A method and apparatus for demodulating an input signal, for example, in a communications system, is disclosed. The apparatus includes a signal preconditioner and a demodulator. The signal preconditioner may include a low-pass filter and a hysteretic comparator that are configured to precondition a preconditioner input signal to provide a preconditioner output signal. The modulator may be configured to demodulate the preconditioner output signal.

The apparatus may be employed as a demodulation system to demodulate a modulated signal such as a frequency modulation (FM) signal, phase shift keying (PSK) signal, frequency shift keying (FSK) signal, quadrature amplitude modulation (QAM) signal, amplitude modulation (AM) signal, phase modulation (PM) signal, and/or the like. Use of a signal preconditioner may be employed to improve the performance of the demodulator by, for example, reducing the SNR at the demodulator input, reducing the effects of high-frequency noise and other noise on demodulation, and/or the like.

Figure 1:
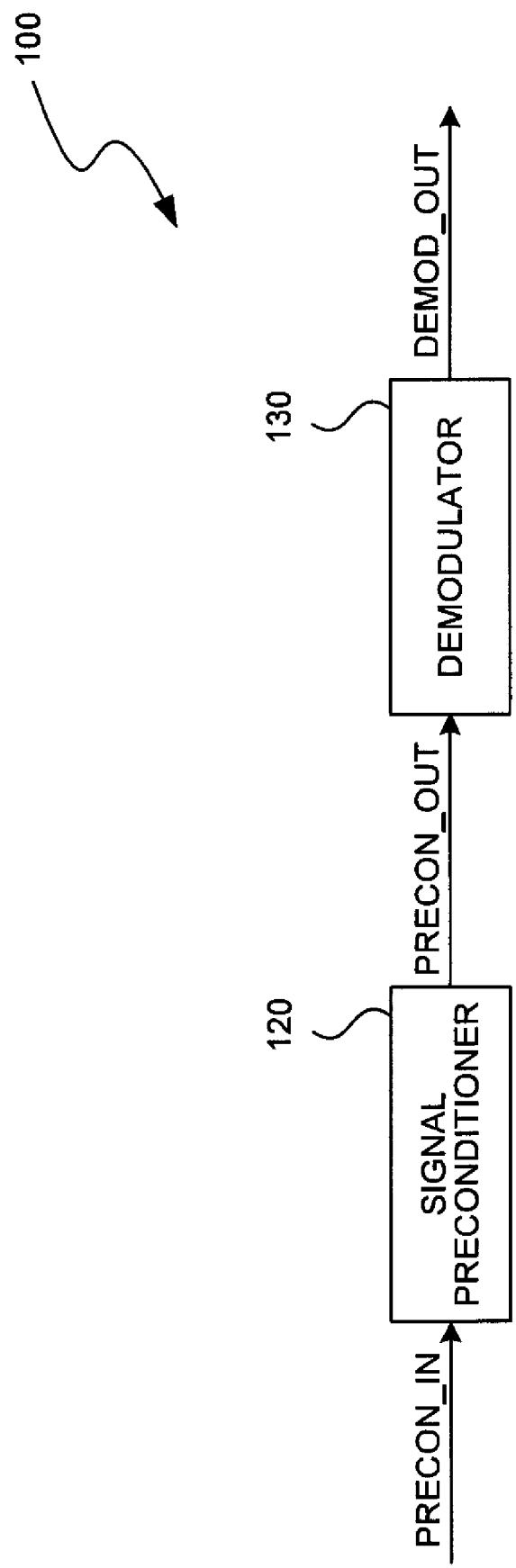
FIG. 1 is a block diagram of a system in accordance with an embodiment of the invention.

FIG. 1 is a block diagram of system 100. As illustrated, system 100 includes signal preconditioner 120 and demodulator 130. In one embodiment, system 100 is configured to demodulate demodulator output signal DEMOD_OUT from preconditioner input signal PRECON_IN. An application-specific integrated circuit (ASIC), discrete components, a mixed-signal integrated circuit, and/or the like, may be employed in system 100. System 100 may also include analog circuitry, digital circuitry, and/or mixed analog/digital circuitry. In addition, system 100 and/or elements thereof may be implemented as digital signal processor (DSP) code to be executed on a DSP.

System 100 may be employed in the receiver or transceiver of communications devices such as cellular phones, wireless phones, wireless network cards, wireless radios, and/or the like. System 100 may also be employed in or by a wide variety of devices and/or systems in which demodulators may be employed. For example, wireless communications devices, wired communications devices, interface systems, computing devices, optical media devices, embedded systems, and/or other electronic devices or circuits may employ system 100. In one embodiment, system 100 is employed in a receiver of a wireless telephone to demodulate preconditioner input signal PRECON_IN.

Signal preconditioner 120 may be configured to receive preconditioner input signal PRECON_IN and to provide preconditioner output signal PRECON_OUT based on preconditioning preconditioner input signal PRECON_IN. In one embodiment, signal preconditioner 120 is also configured to provide preconditioner output signal PRECON_OUT such that preconditioner output signal PRECON_OUT has a lesser noise component than that of preconditioner input signal PRECON_IN. The operation of signal preconditioner 120 may be as described in further detail with reference to the following figures.

Demodulator 130 may be configured to receive preconditioner output signal PRECON_OUT and to provide demodulator output signal DEMOD_OUT. Demodulator 130 may be further configured to demodulate preconditioner output signal PRECON_OUT and to provide data encoded on preconditioner output signal PRECON_OUT (e.g., a data component) on or as demodulator output signal DEMOD_OUT. Demodulator 130 may also be configured as an FM demodulator, PSK demodulator, FSK demodulator, QAM demodulator, AM demodulator, PM demodulator, and/or the like. In one embodiment, demodulator 130 is configured as an FM/FSK demodulator.

Figure 2:
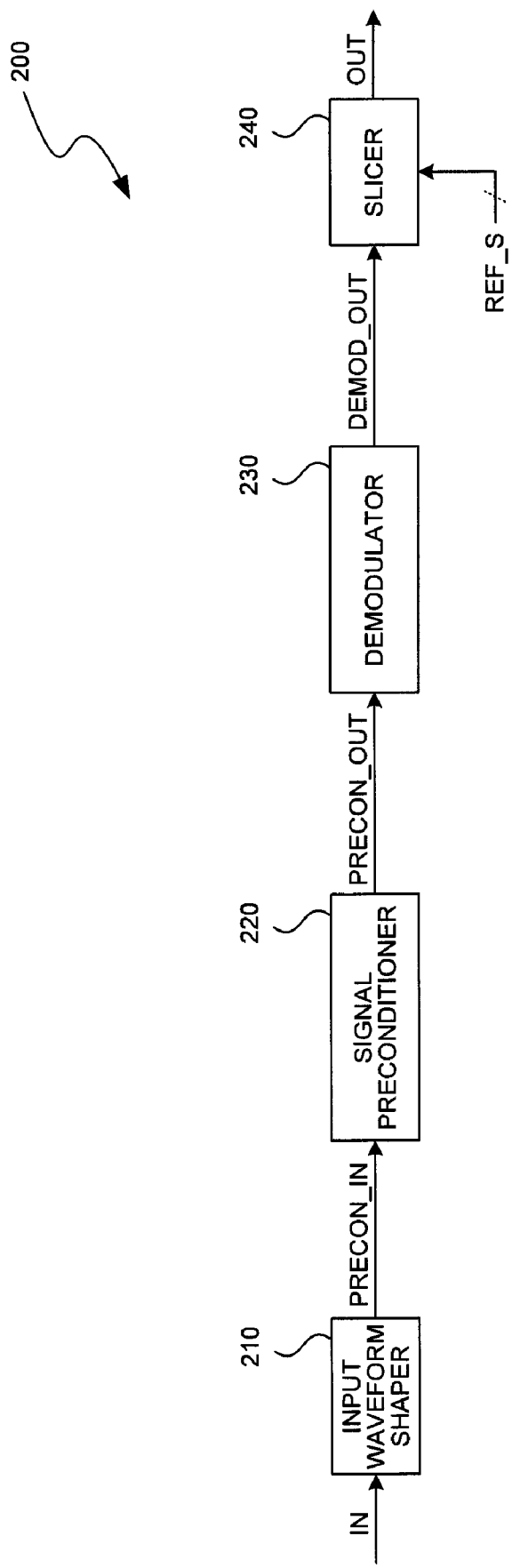
FIG. 2 is a block diagram of a system in accordance with another embodiment of the invention.

FIG. 2 is a block diagram of system 200. As illustrated, system 200 includes input waveform shaper 210, signal preconditioner 220, demodulator 230, and slicer 240. System 200 may be employed as an embodiment of system 100 of FIG. 1 and may also be configured to demodulate output signal OUT from input signal IN.

As shown, input waveform shaper 210 is configured to receive input signal IN and to provide preconditioner input signal PRECON_IN. For example, input signal IN may be received from an antenna or other physical layer interface, from a low noise amplifier (LNA), from an intermediate frequency amplifier, from an intermediate frequency mixer, and/or the like.

In one embodiment, input waveform shaper 210 is a Schmitt trigger configured to provide a square wave and/or binary output from an analog input signal. For example, input waveform shaper 210 may be configured to provide preconditioner input signal PRECON_IN by digitizing input signal IN. Input waveform shaper 210 may also include an LNA configured to receive a radio frequency (RF) input signal from an antenna, a clipper circuit, a comparator, a limiting amplifier, an operational amplifier, an RF amplifier, a variable gain amplifier, and/or the like, in addition to, or instead of, a Schmitt trigger. In addition, input waveform shaper 210 may be referenced to ground or to any other suitable value.

Signal preconditioner 220 may be employed as an embodiment of signal preconditioner 120 of FIG. 1. Generally, filtration or other conditioning of a digitized demodulator input signal such as preconditioner input signal PRECON_IN or preconditioner output signal PRECON_OUT was not performed due to the difficulty of removing and/or reducing the noise component without adversely affecting the data component of the digitized demodulator input signal.

Demodulator 230 may be employed as an embodiment of demodulator 130 of FIG. 1.

As illustrated, slicer 240 is configured to receive demodulator output signal DEMOD_OUT, to receive one or more slicer reference signals REF_S, and to provide output signal OUT. Slicer 240 may also be configured to provide output signal OUT by digitizing demodulator output signal DEMOD_OUT. For example, slicer 240 may include a hysteretic comparator or Schmitt trigger configured to compare demodulator output signal DEMOD_OUT to one or more slicer reference signals REF_S (e.g., a single analog reference signal, a high reference signal and a low reference signal, a digital reference value, etc.) and to provide a binary value on output signal OUT based on the comparison. In other embodiments, an analog to digital converter, sample and hold circuit, non-hysteretic comparator, clipper circuit, limiting amplifier, operational amplifier, variable gain amplifier, and/or the like, may also be suitably employed in slicer 240.

Output signal OUT may be provided as a recovered bit stream from a physical layer interface and may be provided for downstream processing to a vocoder, a decryption device, an error correction device, and/or the like.

In one embodiment, signal preconditioner 220, demodulator 230, slicer 240, and/or elements thereof may be implemented as digital signal processor (DSP) code to be executed on a DSP.

Figure 3:
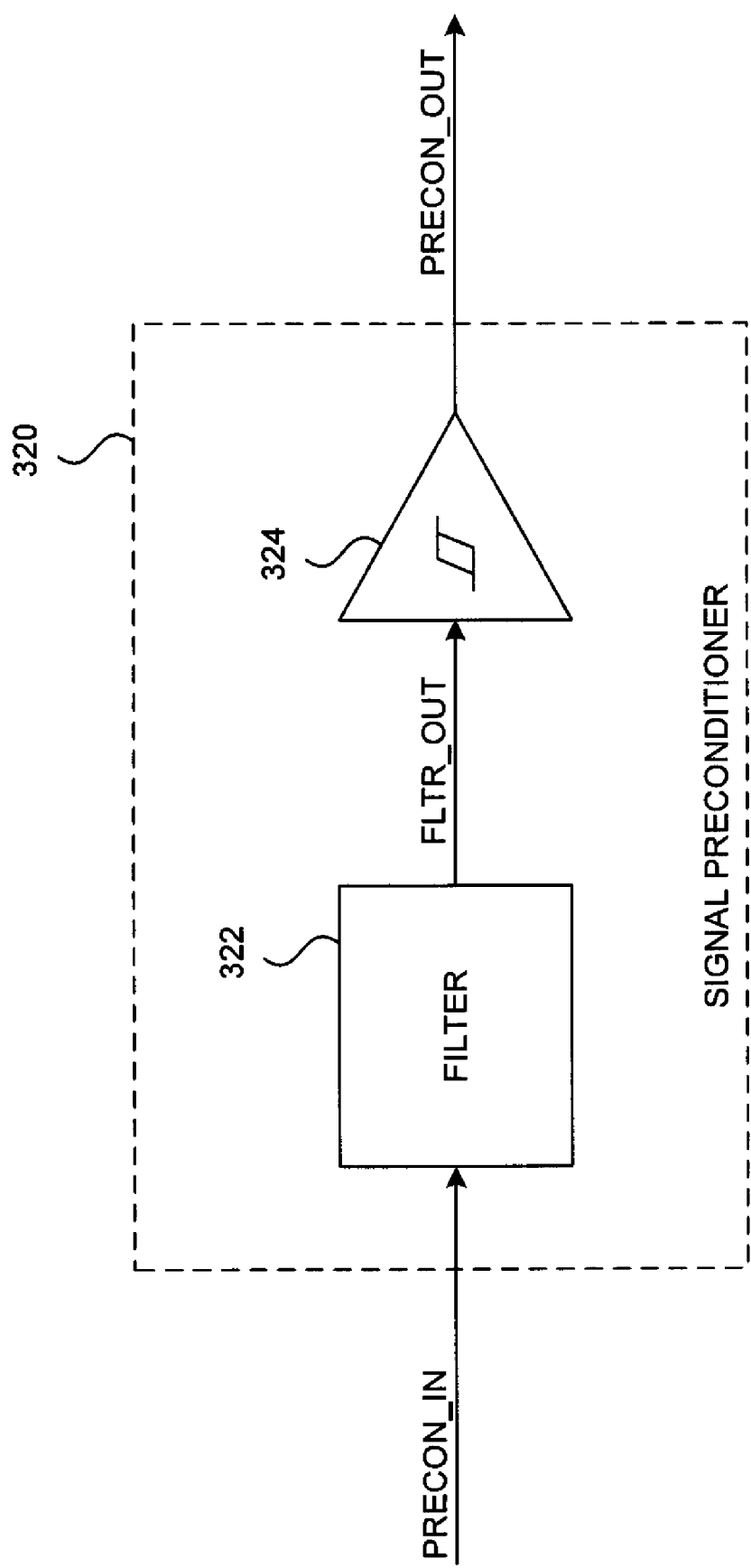
FIG. 3 is a block diagram of a preconditioner of FIG. 1 and/or FIG. 2 in accordance with an embodiment of the invention.

FIG. 3 is a block diagram of signal preconditioner 320. As illustrated, signal preconditioner 320 includes filter 322 and comparison module 324. Signal preconditioner 320 may be employed as an embodiment of signal preconditioner 120 of FIG. 1 and/or signal preconditioner 220 of FIG. 2 to provide preconditioner output signal PRECON_OUT based on preconditioner input signal PRECON_IN. Signal preconditioner 320 may be further configured to reduce the noise component on a demodulator input signal (e.g., preconditioner output signal PRECON_OUT).

In one embodiment, filter 322 is configured to receive preconditioner input signal PRECON_IN and to provide filter output signal FLTR_OUT by filtering preconditioner input signal PRECON_IN. Typically, low-pass filters are most suitable for preconditioner input signal PRECON_IN. However, in certain applications, other filters may be suitably employed. In addition, filters with separate in-phase/quadrature signal paths may also be suitably employed. For example, such a filter may receive separate in-phase/quadrature mixed signals, separately filter the in-phase and quadrature mixed signals, and combine the output of the in-phase and quadrature filters at a summing junction (not shown).

Filter 322 may also be any suitable filter. For example, an active or passive surface acoustic wave (SAW) filter, bulk acoustic wave (BAW) filter, crystal filter, RC filter, RLC filter, LC filter, finite impulse response filter, infinite impulse response filter, Chebyshev filter, elliptic filter, Bessel filter, Linkwitz-Riley filter, Butterworth filter, and/or the like may be suitably employed. The characteristics of filter 322 may be configured based on the expected noise component, frequencies, distortion, non-idealities, and/or the like of a given system.

As shown, comparison module 324 is configured to receive filter output signal FLTR_OUT and to provide preconditioner output signal PRECON_OUT. In one embodiment, comparison module 324 is a hysteretic comparator or Schmitt trigger configured to provide a square wave and/or binary output from filter output signal FLTR_OUT. In other embodiments, a non-hysteretic comparator, clipper circuit, limiting amplifier, operational amplifier, and/or the like, may also be suitably employed in comparison module 324. In one embodiment, comparison module 324 is also configured to compare filter output signal FLTR_OUT to any one or more suitable internal preconditioner reference values. However, comparison module 324 may also be configured to compare filter output signal FLTR_OUT to any one or more suitable externally provided preconditioner reference values (not shown).

Figure 4:
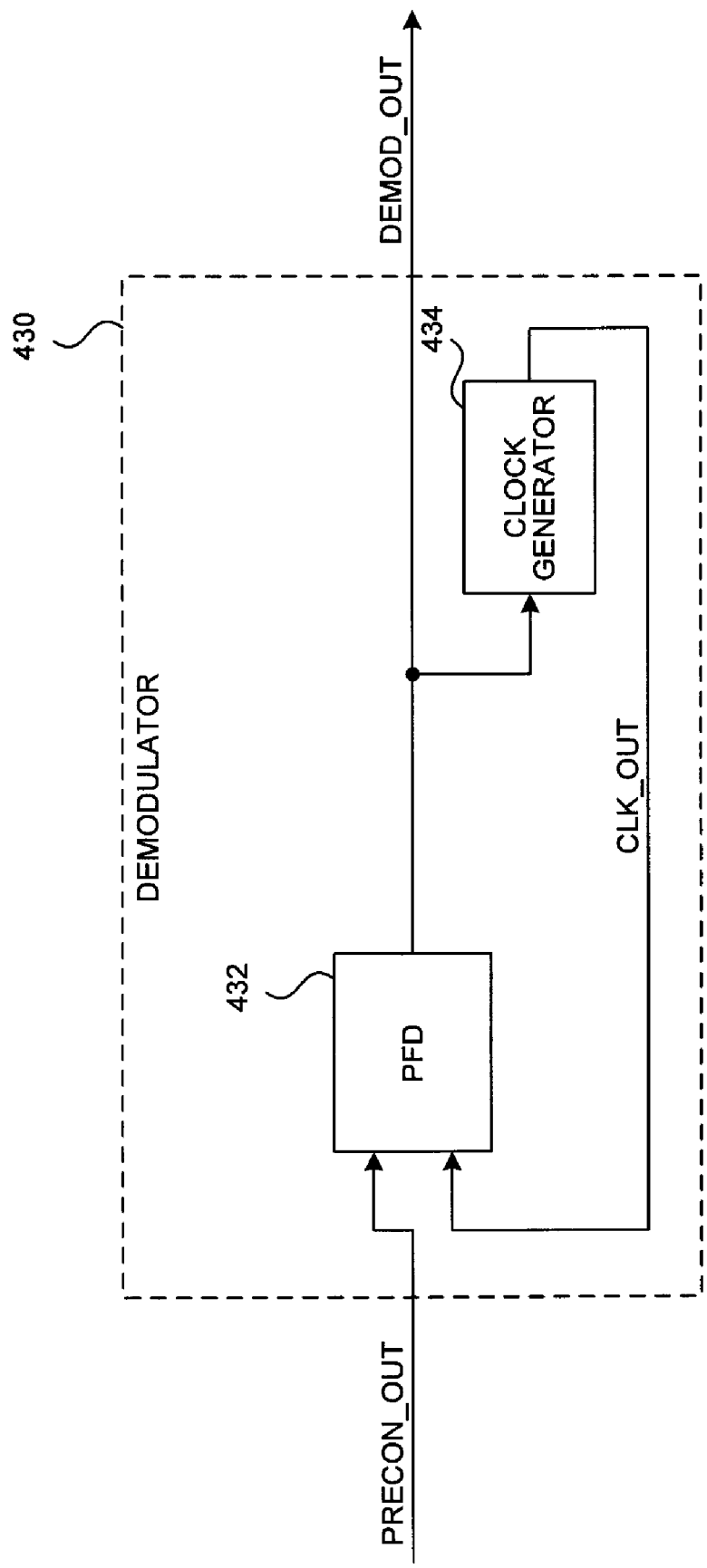
FIG. 4 is a block diagram of a demodulator of FIG. 1 and/or FIG. 2 in accordance with an embodiment of the invention.

In operation, signal preconditioner 320 may be configured to remove and/or reduce noise at the input of a demodulator by providing preconditioner output signal PRECON_OUT without relatively narrow pulses of preconditioner input signal PRECON_IN. For example, filter 322 may be configured to function as a pulse shaper to provide relatively light low-pass filtration. In such an embodiment, relatively narrow pulses on preconditioner input signal PRECON_IN are attenuated to a level such that they do not trigger a change of preconditioner output signal PRECON_OUT. Such operation may function to remove narrow pulses that may otherwise result from high frequency noise on input signal IN. Likewise, signal preconditioner 320 may also function to improve the SNR at a demodulator input FIG. 4 is a block diagram of demodulator 430. As illustrated, demodulator 430 includes phase frequency detector (PFD) 432 and clock generator 434. Demodulator 430 may be employed as an embodiment of demodulator 130 of FIG. 1 and/or demodulator 230 of FIG. 2. Demodulator 430 may also be configured to demodulate demodulator output signal DEMOD_OUT from preconditioner output signal PRECON_OUT. For example, demodulator 430 may be configured to operate as an FM/FSK demodulator. However, in other embodiments, other suitable demodulators may be employed instead of demodulator 430.

As shown, PFD 432 is configured to receive preconditioner output signal PRECON_OUT as a phase lock loop (PLL) input signal, to receive generated clock signal CLK_OUT as a clock feedback signal, and to provide demodulator output signal DEMOD_OUT. For example, PFD 432 may be configured to provide demodulator output signal DEMOD_OUT as both as a phase error signal representing a difference between preconditioner output signal PRECON_OUT and generated clock signal CLK_OUT and as a demodulator output signal. In addition, PFD 432 may also operate as part of a closed feedback loop to drive a frequency and/or phase of demodulator output signal DEMOD_OUT to match that of preconditioner output signal PRECON_OUT.

In one embodiment, PFD 432 is configured to provide a value on demodulator output signal DEMOD_OUT that is proportional to the phase difference between preconditioner output signal PRECON_OUT and generated clock signal CLK_OUT. In another embodiment, PFD 432 may provide a value on demodulator output signal DEMOD_OUT that is proportional to a frequency difference between preconditioner output signal PRECON_OUT and generated clock signal CLK_OUT.

Clock generator 434 is configured to receive demodulator output signal DEMOD_OUT as a clock generator control signal and to provide generated clock signal CLK_OUT. Also, clock generator 434 may be configured to set the frequency of generated clock signal CLK_OUT based on demodulator output signal DEMOD_OUT. Clock generator 434 may include a digital clock synthesizer, a voltage controlled oscillator, a current controlled oscillator, a crystal oscillator, a ring oscillator, a surface acoustic wave oscillator, a Colpitts oscillator, and/or the like.

In one embodiment, demodulator 430 may also include a charge pump and/or low-pass filter (not shown) configured to provide the input to clock generator 434 based on the output of PFD 432. Likewise, demodulator 430 may also include a frequency divider, multiplier, or other module configured to indirectly provide a clock feedback signal to PFD 432. For example, such a module may be employed to further configure the output of demodulator output signal DEMOD_OUT.

Examples of other demodulators and the operation thereof are further described in U.S. patent application entitled "Method and Apparatus For Digital Clock Recovery" by S. Li et al., having Ser. No. 12/256,397, the entirety of which is hereby incorporated by reference, and in U.S. patent application entitled "Selectable Intermediate Frequency Demodulator" by P. Zhang et al., having Ser. No. 12/350,867, the entirety of which is hereby incorporated by reference.

FIGS. 5A-5D are timing diagrams illustrating aspects of the operation of some of the above described embodiments. While FIGS. 5A-5D are described with reference to specific embodiments, the invention is not limited to these embodiments. Other frequency controllers, circuits, systems, and/or the like may also be employed. Likewise, operation of other embodiments of the invention may be different than depicted by FIGS. 5A-5D. FIGS. 5A-5D are not drawn to scale.

Figure 5A:
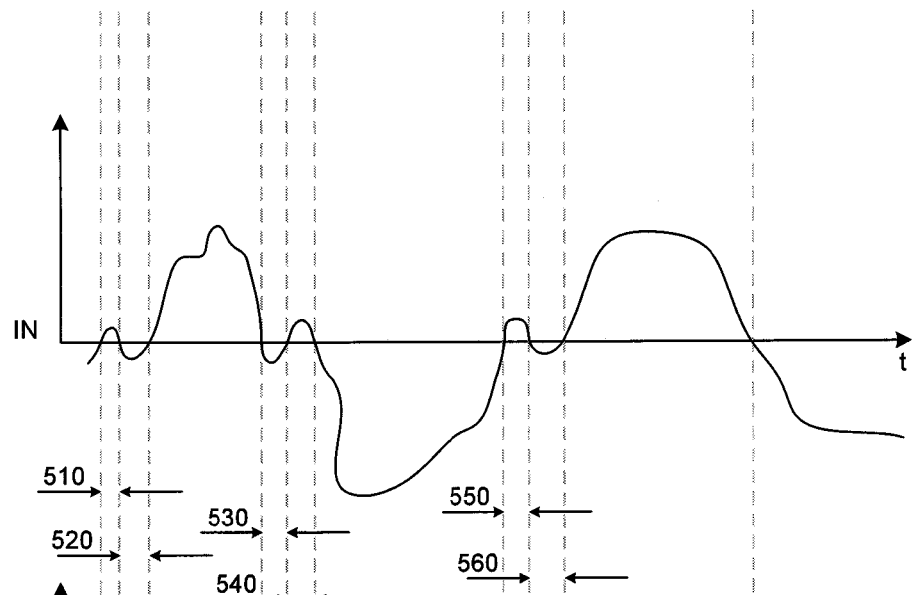
FIGS. 5A-5D are timing diagrams illustrating aspects of the operation of embodiments of the invention.
Figure 5B:
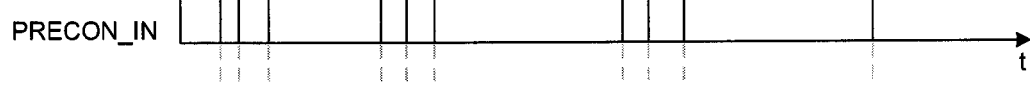

FIG. 5A illustrates an example of an FM input signal IN that has a relatively large noise component. As shown in FIG. 5A, the relatively large noise component results in a distorted sinusoidal waveform. As shown in FIG. 5B, input waveform shaper 210 may generate narrow pulses during periods 510, 520, 530, 540, 550, and 560 due to the extraneous transitions of input signal IN about a reference value of input waveform shaper 210.

Figure 5C:
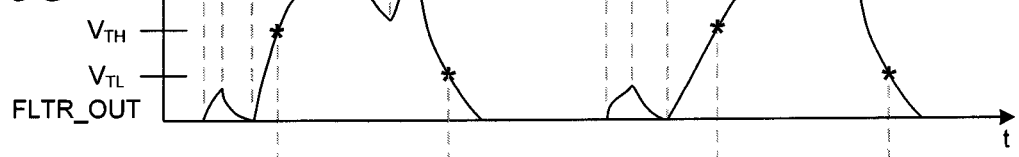
Figure 5D:
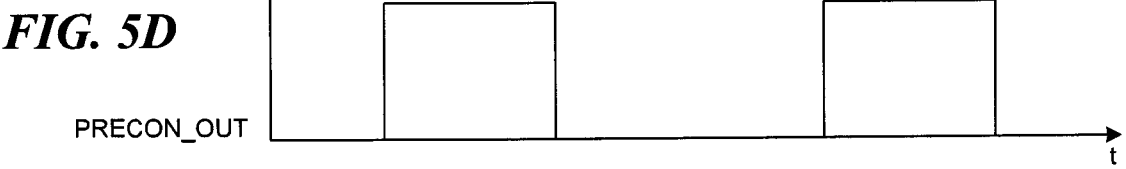

As illustrated in FIG. 5C, filter 322 filters preconditioner input signal PRECON_IN to provide filter output signal FLTR_OUT such that the narrow pulses do not cause filter output signal FLTR_OUT to transition to the comparison module 324 transition point(s). As shown in FIG. 5D, comparison module 324 may digitize filter output signal FLTR_OUT to provide preconditioner output signal PRECON_OUT. Preconditioner output signal PRECON_OUT may then be demodulated by demodulator 430 or another suitable demodulator.

While the above Detailed Description describes certain embodiments of the invention, and describes the best mode contemplated, no matter how detailed the above appears in text, the invention can be practiced in many ways. Details of the system may vary in implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description explicitly defines such terms. Accordingly, the actual scope of the invention encompasses not only the disclosed embodiments, but also all equivalent ways of practicing or implementing the invention under the claims.

We claim:

1. An apparatus for demodulating a signal, comprising:
   a signal preconditioner configured to receive a preconditioner input signal and to provide a preconditioner output signal based on a filtration of the preconditioner input signal into a filter output signal and a comparison of the filter output signal to one or more preconditioner references; and
   a demodulator configured to receive the preconditioner output signal and to provide a demodulator output signal by demodulating the preconditioner output signal, the demodulator including
      a phase frequency detector configured to provide the demodulator output signal based on a difference between a phase lock loop (PLL) input signal and a clock feedback signal, wherein the PLL input signal is based on the preconditioner output signal and the clock feedback signal is based on a generated clock signal; and
      a clock generator configured to generate the generated clock signal based on the demodulator output signal.

2. The apparatus of claim 1, wherein the signal preconditioner includes:
   a filter configured to receive the preconditioner input signal and to provide the filter output signal by filtering the preconditioner input signal; and
   a comparison module configured to receive the filter output signal and to provide the preconditioner output signal by comparing the filter output signal against the one or more preconditioner references.

3. The apparatus of claim 2, wherein the comparison module includes at least one of a hysteretic comparator, a Schmitt trigger, or a non-hysteretic comparator.

4. The apparatus of claim 2, wherein the filter is configured as a low-pass filter.

5. The apparatus of claim 1, wherein the signal preconditioner is configured to improve a signal-to-noise ratio (SNR) at an input of the demodulator.

6. The apparatus of claim 1, wherein the signal preconditioner is configured to reduce an effect of high frequency noise on the demodulator.

7. The apparatus of claim 1, wherein the demodulator is configured to operate as a phase lock loop (PLL) based frequency shift keying (FSK) demodulator.

8. The apparatus of claim 1, further comprising: an input waveform shaper configured to receive an input signal and to provide the preconditioner input signal by digitizing the input signal.

9. The apparatus of claim 8, wherein the input waveform shaper includes at least one of a hysteretic comparator, a Schmitt trigger, a non-hysteretic comparator, a limiting amplifier, or a clipper circuit.

10. The apparatus of claim 1, further comprising: a slicer configured to receive the demodulator output signal and to provide an output signal by digitizing the demodulator output signal.

11. The apparatus of claim 10, wherein the slicer includes at least one of a hysteretic comparator or a Schmitt trigger.

12. The apparatus of claim 1, wherein the signal preconditioner and demodulator are further configured to operate in the receiver or transceiver of a cellular phone, a wireless phone, a wireless network card, or a wireless radio.

13. A method of demodulating a signal, comprising:
receiving a preconditioner input signal;
providing a preconditioner output signal from the preconditioner input signal, including:
filtering the preconditioner input signal into a filter output signal; and
comparing the filter output signal to one or more preconditioner references; and
demodulating a demodulator output signal from the preconditioner output signal including
providing the demodulator output signal based on a difference between a phase lock loop (PLL) input signal and a clock feedback signal, wherein the PLL input signal is based on the preconditioner output signal and the clock feedback signal is based on a generated clock signal; and
generating the generated clock signal based on the demodulator output signal.

14. The method of claim 13, wherein filtering the preconditioner input signal includes:
low-pass filtering the preconditioner input signal into a filter output signal, and
wherein comparing the filter output signal includes:
hysteretically comparing the filter output signal against one or more preconditioner references.

15. The method of claim 13, further comprising:
receiving an input signal; and
digitizing the input signal to provide the received preconditioner input signal.

16. The method of claim 13, further comprising: digitizing the demodulator output signal.

17. An apparatus for demodulating a signal, comprising:
means for receiving a preconditioner input signal;
means for providing a preconditioner output signal from the preconditioner input signal, including:
means for low-pass filtering the preconditioner input signal into a filter output signal;
means for hysteretically comparing the filter output signal to one or more preconditioner references;
means for demodulating a demodulator output signal from the preconditioner output signal,
means for receiving an input signal; and
means for digitizing the input signal to provide the received preconditioner input signal; and means for digitizing the demodulator output signal, wherein the means for demodulating the demodulator output signal includes:
means for providing the demodulator output signal based on a difference between a phase lock loop (PLL) input signal and a clock feedback signal, wherein the PLL input signal is based on the preconditioner output signal and the clock feedback signal is based on a generated clock signal; and
means for generating the generated clock signal based on the demodulator output signal.

* * * * *